US 8,245,084 B2

(12) United States Patent
Bell, Jr. et al.

(10) Patent No.: US 8,245,084 B2
(45) Date of Patent: Aug. 14, 2012

(54) TWO-LEVEL REPRESENTATIVE WORKLOAD PHASE DETECTION

(75) Inventors: Robert H. Bell, Jr., Austin, TX (US); Wen-Tzer Thomas Chen, Austin, TX (US); Venkat Rajeev Indukuru, Austin, TX (US); Pattabi Michael Seshadri, Austin, TX (US); Madhavi Gopal Valluri, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 1250 days.

(21) Appl. No.: 11/972,678

(22) Filed: Jan. 11, 2008

(65) Prior Publication Data

US 2009/0182994 A1 Jul. 16, 2009

(51) Int. Cl.
*G06F 11/00* (2006.01)

(52) U.S. Cl. .............. 714/45; 703/14; 703/22; 716/132; 716/136

(58) Field of Classification Search ............... 703/14, 703/22; 714/45; 716/132, 136
See application file for complete search history.

(56) References Cited

U.S. PATENT DOCUMENTS

| | | | |
|---|---|---|---|
| 6,189,072 B1 | 2/2001 | Levine et al. | |
| 6,223,171 B1 | 4/2001 | Chaudhuri et al. | |
| 7,065,624 B1 | 6/2006 | Zahavi | |
| 7,398,191 B1* | 7/2008 | Gluhovsky et al. | ............... 703/2 |
| 7,401,012 B1* | 7/2008 | Bonebakker et al. | ............. 703/2 |
| 7,555,419 B2* | 6/2009 | Faraboschi et al. | ............. 703/22 |
| 8,000,953 B2* | 8/2011 | Bell et al. | ............. 703/22 |
| 2004/0068701 A1* | 4/2004 | Chang et al. | ............. 716/4 |
| 2004/0111708 A1 | 6/2004 | Calder et al. | |
| 2006/0090161 A1 | 4/2006 | Bodas et al. | |
| 2006/0106923 A1 | 5/2006 | Balasubramanian et al. | |
| 2006/0112377 A1 | 5/2006 | Nacul et al. | |
| 2007/0016560 A1 | 1/2007 | Gu et al. | |
| 2008/0307203 A1* | 12/2008 | Bell et al. | ............. 712/210 |
| 2009/0024378 A1* | 1/2009 | Dierickx et al. | ............. 703/14 |
| 2009/0055153 A1* | 2/2009 | Bell et al. | ............. 703/21 |
| 2009/0055594 A1* | 2/2009 | Berg et al. | ............. 711/136 |
| 2009/0125465 A1* | 5/2009 | Berg et al. | ............. 706/17 |

OTHER PUBLICATIONS

Hamerly et al., "Simpoint 3.0: Faster and More Flexible Program Analysis," J. Instruction-Level Parallelism, vol. 7 Sep. 2005; http://www.jilp.org/vol7. 28 pages.*
Tanenbaum, Andrew. "Structured Computer Organization," Second Edition. Englewood Cliffs, NJ: Prentice-Hall, Inc., 1984.*

(Continued)

*Primary Examiner* — Robert Beausoliel, Jr.
*Assistant Examiner* — Joshua P Lottich
(74) *Attorney, Agent, or Firm* — Yee & Associates, P.C.; David A. Mims, Jr.

(57) ABSTRACT

A subset of a workload, which includes a total set of dynamic instructions, is identified to use as a trace. Processor unit hardware executes the entire workload in real-time using a particular dataset. The processor unit hardware includes at least one microprocessor and at least one cache. The real-time execution of the workload is monitored to obtain information about how the processor unit hardware executes the workload when the workload is executed using the particular dataset to form actual performance information. Multiple different subsets of the workload are generated. The execution of each one of the subsets by the processor unit hardware is compared with the actual performance information. A result of the comparison is used to select one of the plurality of different subsets that most closely represents the execution of the entire workload using the particular dataset to use as a trace.

20 Claims, 7 Drawing Sheets

OTHER PUBLICATIONS

Wu et al. "From trace generation to visualization: a performance framework for distributed parallel systems." In Proceedings of the 2000 ACM/IEEE Conference on Supercomputing (Cdrom) (Dallas, TX, Nov 4-10, 2000, 18 pages.*

U.S. Appl. No. 11/872,337, filed Aug. 21, 2007, Bell, Jr. et al.
U.S. Appl. No. 11/758,031, filed Jun. 5, 2007, Bell, Jr. et al.

* cited by examiner

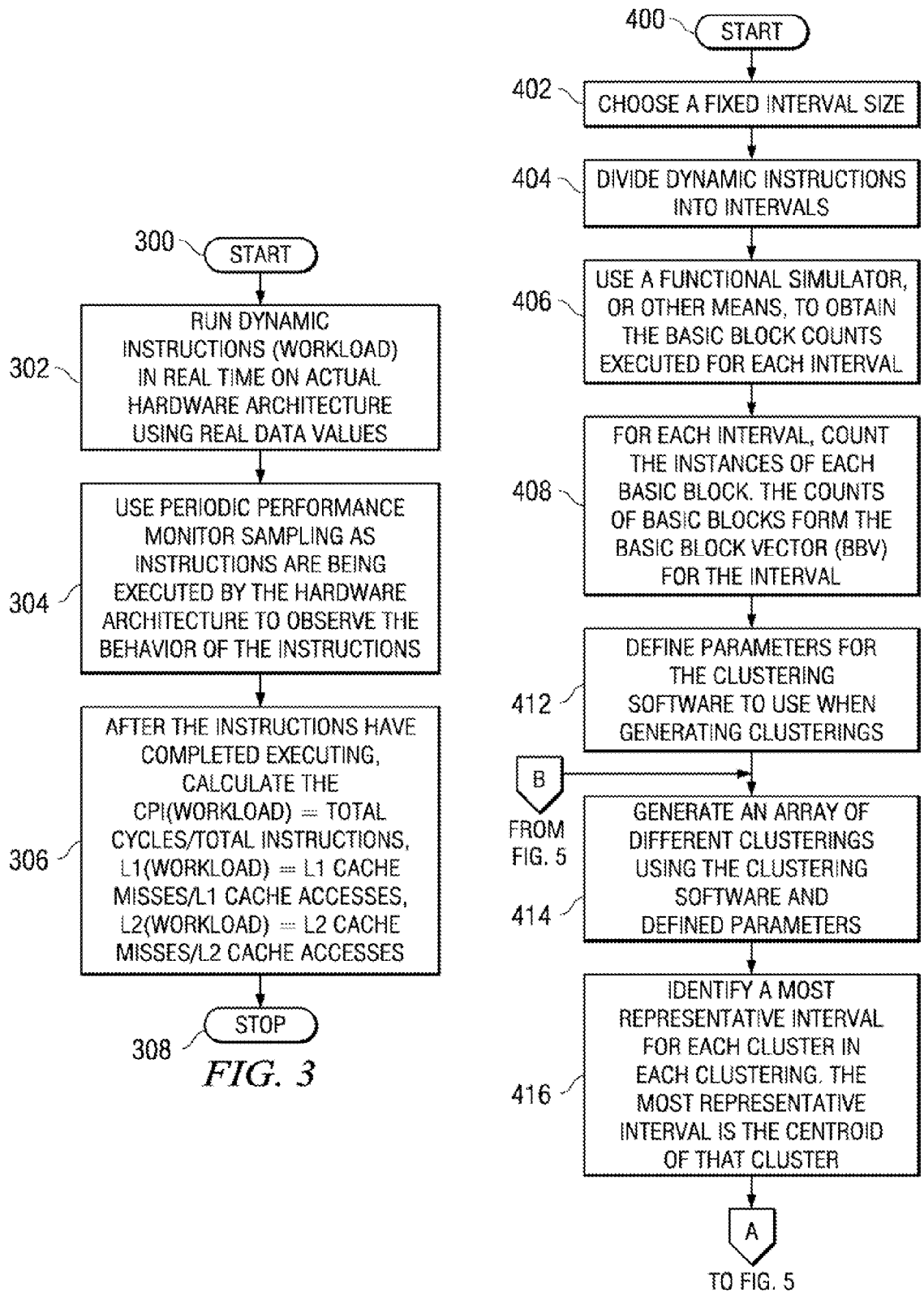

TWO-LEVEL REPRESENTATIVE WORKLOAD PHASE DETECTION

BACKGROUND OF THE INVENTION

1. Field of the Invention

The present invention relates generally to the data processing field and, more particularly, to a two-level representative workload phase detection method, apparatus, and computer usable program code.

2. Description of the Related Art

Modern software workloads, such as the SPEC2006 benchmark, can have dynamic instruction pathlengths of many trillions of instructions for a single dataset. A "dataset" is the input data consumed by the program. For example, fully executing h264ref, from the SPEC2006 benchmark, with its third input dataset has 3.2 trillion dynamic instructions. Indeed, most programs exhibit more than one trillion dynamic instructions.

Trace-driven simulators are used that simulate the behavior of a particular processor unit design. A processor unit includes one or more processors along with one or more caches, such as L1 and L2 caches. In order to assess design changes and project workload performance for processor units that are being designed, the simulator would ideally be used to execute the entire workload. However, this is not feasible.

These simulators execute on the order of 10,000 instructions per second on modern machines. Therefore, for a program with 1 trillion dynamic instructions, simulation would take on the order of 3.1 years to complete. Because of the performance effect of warmed-up caches and processor state, the simulation would have to be done serially on a single processor unit to correctly represent the performance of the processor unit. If some accuracy is sacrificed, the instruction sequences can be split onto multiple processors, but still millions of instructions must be executed to warm up the processor prior to collecting performance results on the subset of instructions.

To reduce the number of instructions executed, the workload, i.e. the dynamic instruction sequence, can be sampled at periodic intervals, and those instructions concatenated into a trace that is used instead of the entire workload. The trace, instead of the entire dynamic instruction sequence, is then fed into the trace-driven simulator in order to assess a particular processor unit design. Generating a trace automatically incorporates the machine effects of a particular input dataset.

Dynamic instructions in a workload often exhibit phases of execution, i.e. repetitive sequences of instructions, that correlate strongly to the basic blocks being executed by a program.

A promising automated clustering-based method for trace sample selection that has recently been proposed is known as "SimPoint." SimPoint is an example of clustering software that takes a workload and some user-defined parameters as an input, and generates a "clustering" that includes a plurality of clusters. The resulting clustering is considered to be representative of the entire workload within an error tolerance. The trace of instructions that best represent the clusters can then be executed rapidly by a trace-driven simulator in order to assess a particular processor design.

The clustering software works by clustering, or grouping, intervals of the workload based on the code profile of each interval, which is represented by a basic block vector (BBV) for each interval, to produce a plurality of clusters. The BBV consists of the frequencies that basic blocks appear in the interval weighted by the numbers of instructions in the basic blocks. By clustering intervals by BBV, the clustering software aims to sort intervals by their code profiles into "phases," where each "cluster" represents a phase of program execution. A phase is an ideality, i.e. it is the perfect cluster that represents a true phase of the program execution perfectly. A cluster is often an imperfect representation of a phase, as the phase can sometimes be split between two or more clusters if the clustering software is not allowed to run long enough or work hard enough to determine that the intervals all belong to one cluster.

Simply using the clusters of basic blocks does not, however, take into account the effects on the performance of a particular processor unit design when a program and input dataset is executed on the particular processor unit design. The BBVs do not take into account the input dataset values and data footprint. The data footprint of a program includes the actual cache memory and main memory instruction and data access patterns.

The prior art does not incorporate the machine-specific characteristics related to how a particular processor unit design executes particular input datasets into the process of generating a clustering that best represents the performance of a particular processor unit and system design when the particular processor unit design is executing a particular workload. As a result, the clustering often does not capture the dataset characteristics of the workload on either the processors or the caches found in a particular processor unit design. This reduces the accuracy of simulation studies to assess design changes and to project performance.

SUMMARY OP THE INVENTION

The present invention provides two-level representative workload phase detection. In the first level, user-defined parameters and a particular workload trace divided into intervals of basic block vectors are provided to clustering software. The clustering software then generates an array of different clusterings for the particular workload. Each clustering includes a plurality of clusters. A most-representative interval for each cluster is determined, which is generally the centroid of the cluster.

In the second level, the particular workload is run on actual hardware, which includes the particular processor unit design, in real-time. While the workload is being executed by the hardware, performance monitor sampling is used to collect information about how the particular process unit executes the particular workload and a particular dataset. That is, the performance monitor is used to determine the overall characteristics of the entire workload on the actual hardware. Thus, while the workload is being executed by the hardware, the cycles per instruction (CPI), the L1 cache miss rate, and the L2 cache miss rate are determined for the entire workload. In addition, the CPI, the L1 cache miss rate, and the L2 cache miss rate are also determined for each interval while the workload is being executed.

The characteristics of each one of the clusterings in the array of clusterings are analyzed using the most-representative interval, i.e. the centroid, of each cluster in the clustering. The characteristics of the most-representative intervals are compared against the characteristics of the entire workload on the actual hardware. The clustering that most closely mirrors the performance of the workload as that, workload was executed on the actual hardware is then selected to be used as a trace.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 depicts a high level flow chart that illustrates obtaining cycles per instructions (CPI), the L1 cache miss rate, and the L2 cache miss rate that are based on the execution of the workload (i.e. the dynamic instructions) on the actual hardware architecture using real data values in accordance with an illustrative embodiment;

FIGS. 4 and 5 together illustrate a high level flowchart that depicts a clustering selection routine that selects a clustering that most closely represents the behavior of the original workload as that workload was run in real-time on actual hardware, which includes a particular processor unit design, in accordance with an illustrative embodiment;

DETAILED DESCRIPTION OF THE PREFERRED EMBODIMENT

Figure 1:
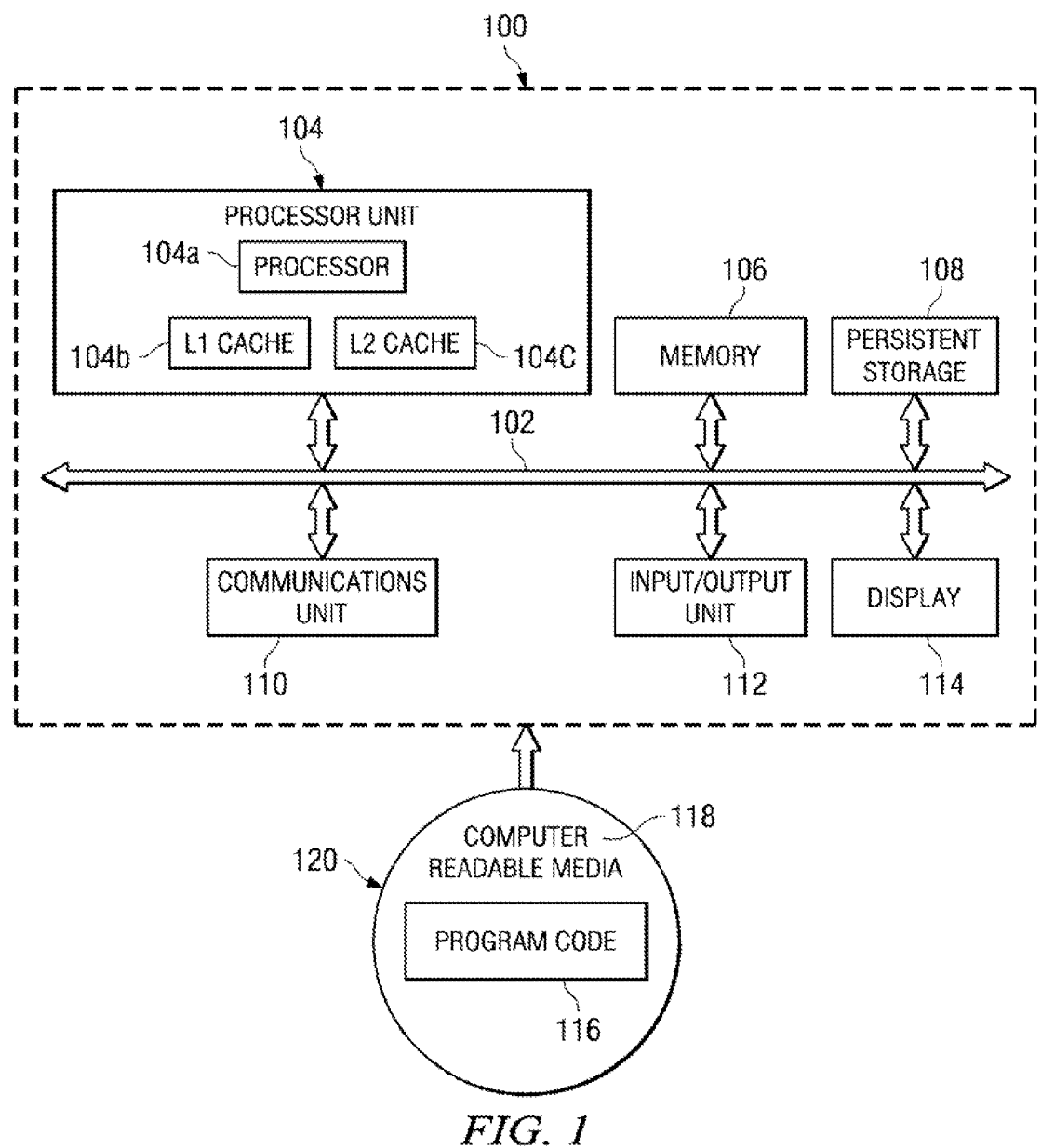
FIG. 1 depicts a diagram of a data processing system in accordance with an illustrative embodiment.

Turning now to FIG. 1, a diagram of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors, such as processor 104a, or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type. Processor unit 104 also includes an L1 cache 104b and an L2 cache 104c.

Memory 106, in these examples, may be, for example, a random access memory. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as, program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 and may be loaded onto or transferred to data processing system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive or a flash memory that is connected to data processing system 100. The tangible form of computer readable media 118 is also referred to as computer recordable storage media.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown.

For example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Figure 2:
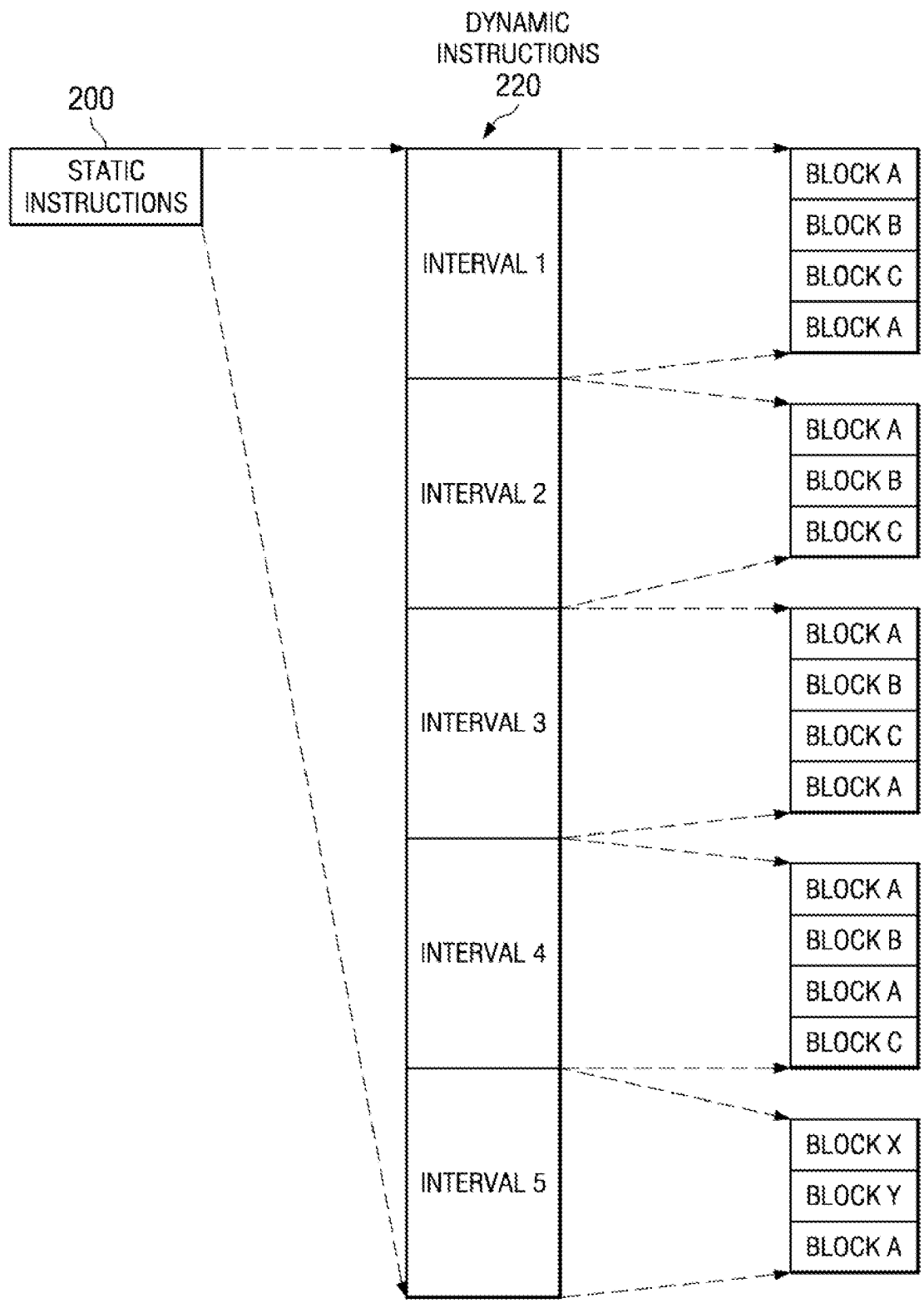
FIG. 2 illustrates a block diagram of an example cluster that was assembled from intervals of a workload in accordance with an illustrative embodiment.

FIG. 2 illustrates a block diagram of an example cluster that was assembled from intervals of a workload in accordance with an illustrative embodiment. Static instructions 200 are the static instructions that were compiled into the program binary. Dynamic instructions 220 are the actual workload sequence of instructions on a processor unit when static instructions 200 of a binary are executed. For example, static instructions 200 might include just five instructions in a loop that is to be executed 10,000 times. Thus, static instructions 200 are five instructions, while dynamic instructions amount to 50,000, which is the workload on the processor unit when static instructions 200 are executed.

Basic blocks of instructions are identified within dynamic instructions 220. A basic block is a set of instructions after a branch instruction and up to, and including, the next branch instruction. One or more basic blocks may occur multiple times within dynamic instructions 220.

Dynamic instructions 220 are divided into chunks, called intervals. In the example depicted in FIG. 2, dynamic instructions 220 are divided into five intervals, intervals 1-5. Interval 1 includes basic blocks A, B, and C. Block A occurs twice within interval 1. That is, there are two instances of block A in interval 1.

Interval 2 includes one instance each of blocks A, B, and C. Interval 3 includes two instances of block A, and one instance each of blocks B and C, interval 4 includes two instances of block A, and one instance each of blocks B and C. Interval 5 includes one instance each of blocks X, Y, and A.

A basic block vector (BBV) is then determined, using prior art methods, for each interval. The BBV is the frequency of each block in the interval weighted by the number of instructions in the basic block. Clustering software uses the BBVs and defined parameters to assemble similar intervals into clusters to produce a clustering.

The clustering software can be used to generate a plurality of different clusterings, where each clustering represents the entire dynamic instructions.

FIG. 3 depicts a high level flow chart that illustrates obtaining cycles per instructions (CPI), the L1 cache miss rate, and the L2 cache miss rate that are based on the execution of the workload (i.e. all of the dynamic instructions) on the actual hardware architecture using real data values in accordance with an illustrative embodiment. The process starts as depicted by block 300 and thereafter passes to block 302, which illustrates running dynamic instructions, which are the "workload", in real time on actual hardware architecture using real datasets, i.e. the real data values. The actual hardware is a particular processor unit manufactured according to a particular design.

Next, block 304 depicts using periodic performance monitor sampling as the dynamic instructions are being executed using the actual processor unit, which includes a particular microprocessor architecture, an L1 cache, and an L2 cache. The behavior of the instructions on the actual hardware may be observed using a performance monitor or similar hardware.

Thereafter, block 306 illustrates calculating the CPI, L1 cache miss rate, and L2 cache miss rate using the data obtained by the performance monitor as the dynamic instructions were executed. The CPI for the entire workload, referred to herein as CPI(workload), is calculated by dividing the number of total cycles by the number of total instructions. The L1 cache miss rate for the entire workload, referred to herein as L1(workload), is determined by dividing the number of L1 cache misses by the number of L1 cache accesses. The L2 cache miss rate for the entire workload, referred to herein as L2(workload), is determined by dividing the number of L2 cache misses by the number of L2 cache accesses. The process then terminates as illustrated by block 308.

Figure 5:
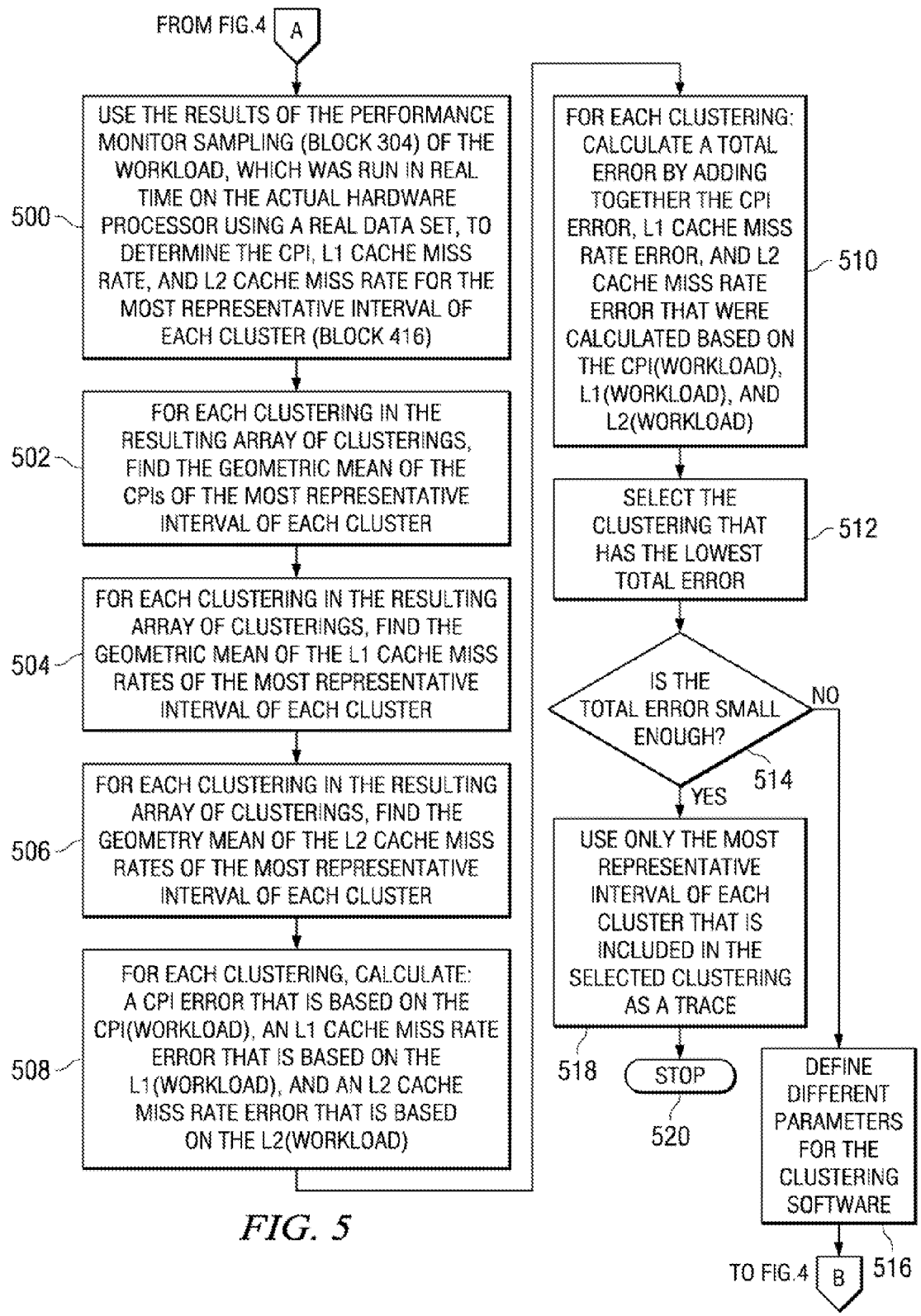

FIGS. 4 and 5 together illustrate a high level flowchart that depicts a clustering selection routine that selects a clustering that most closely represents the behavior of the original workload as that workload was run in real-time on actual hardware, which includes a particular processor unit design, in accordance with an illustrative embodiment.

The process starts as depicted by block 400 and then passes to block 402 which illustrates choosing a fixed interval size, such as 10 million instructions. Next, block 404 depicts dividing the dynamic instructions into intervals.

Block 406 illustrates using a functional simulator, or other means such as specialized hardware, to obtain the basic block counts executed for each interval. The process then passes to block 408 which depicts counting the instances of each basic block for each interval. The counts of basic blocks are used, along with the number of instructions in the basic block, to generate the basic block vector (BBV) for the interval.

Thereafter, block 412 illustrates defining parameters for the clustering software to use when generating clusterings. Such parameters are well-known to those skilled in the art and include the total number of clusters to generate for the clustering, the maximum number of algorithm iterations allowed to search for well-formed clusters, the tolerance of error in the algorithm results for the clustering, etc. Next, block 414 depicts the clustering software using the parameters to generate an array of different clusterings. Block 416, then, illustrates identifying a most representative interval for each cluster in each clustering. The most representative interval of each cluster may be identified many ways, as will be appreciated by those skilled in the art. In the illustrative embodiment, it is identified as the centroid of the cluster, where the centroid is the interval in the cluster with the smallest Euclidean distance from all other intervals in the cluster. The Euclidean distance may be defined as the square root of the sum of the squared differences between the frequencies of each basic block in one interval and those of another interval. The process then passes to block 500, which is depicted in FIG. 5.

Block 500 illustrates using the results of the performance monitor or hardware sampling to determine the CPI, L1 cache miss rate, and the L2 cache miss rate for the most representative interval of each cluster (as determined according to block 416). The CPI, L1 cache miss rate, and L2 cache miss rate are determined based on the values observed by the performance monitor or hardware sampling, which were obtained as depicted by block 304, while the entire set of dynamic instructions were executed by the actual hardware processor unit in real-time using a real dataset.

The hardware samples may cover the entire interval or may be periodic samples within the interval. In the present embodiment, the samples are periodic and occur every 1 million instructions. Therefore, for the interval size of 10 million instructions, 10 samples are collected for each interval. The CPI, L1 cache miss rate, and L2 cache miss rate values for the interval are then determined by finding the geometric mean of the sampled values of each.

The process then passes to block 502 which depicts, for each clustering in the array of clusterings: taking the CPI of the most representative interval of each cluster, and finding the geometric mean of these CPIs. The process then passes to block 504 which illustrates, for each clustering in the array of clusterings: taking the L1 cache miss rate of the most representative interval of each cluster, and finding the geometric mean of these L1 cache miss rates. The process then passes to block 506 which depicts, for each clustering in the array of clusterings: taking the L2 cache miss rate of the most representative interval of each cluster, and finding the geometric mean of these L2 cache miss rates.

Next, block 508 illustrating, for each clustering, calculating: a CPI error that is based on the CPI(workload), an L1 cache miss rate error that is based on the L1(workload), and an L2 cache miss rate error that is based on the L2(workload). Thereafter, block 510 depicts, for each clustering: calculating a total error for the clustering by adding together the CPI error, L1 cache miss rate error, and L2 cache miss rate error that were calculated based on the CPI(workload), L1(workload), and L2(workload). Next, block 512 illustrates selecting the clustering that has the lower total error.

Block 514 depicts a determination of whether or not the total error is small enough. In the present embodiment, an error of less than 2% is considered small enough. If a determination is made that the total error is not small enough, the process passes to block 516 which illustrates defining different parameters. The process then passes back to block 414. If a determination is made that the total error is small enough, the process passes to block 518 which illustrates using only the most-representative interval from each cluster that is included in the selected clustering as a trace. The process then terminates as depicted by block 520.

Figure 6A:
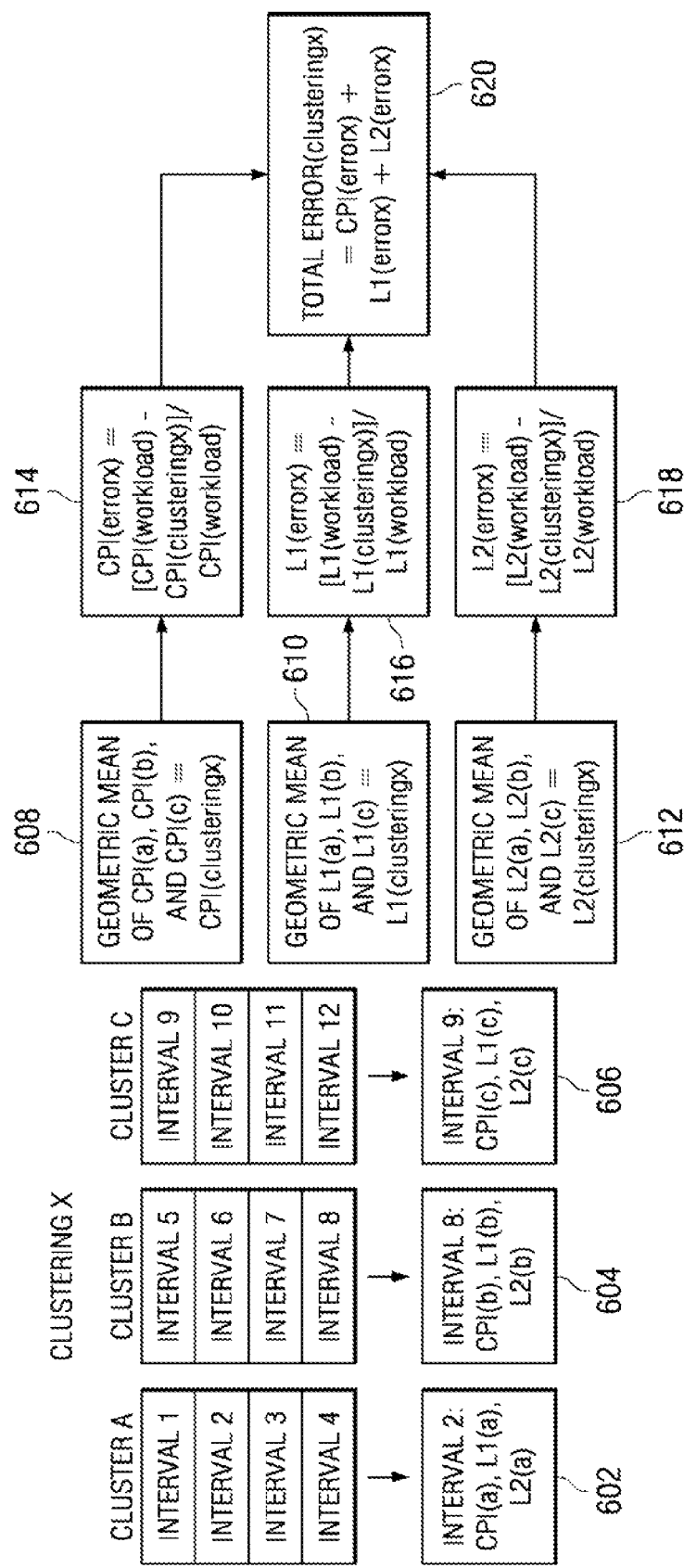
FIGS. 6A and 6B illustrate a block diagram that depicts two clusterings that were generated by the clustering routine in accordance with an illustrative embodiment.
Figure 6B:
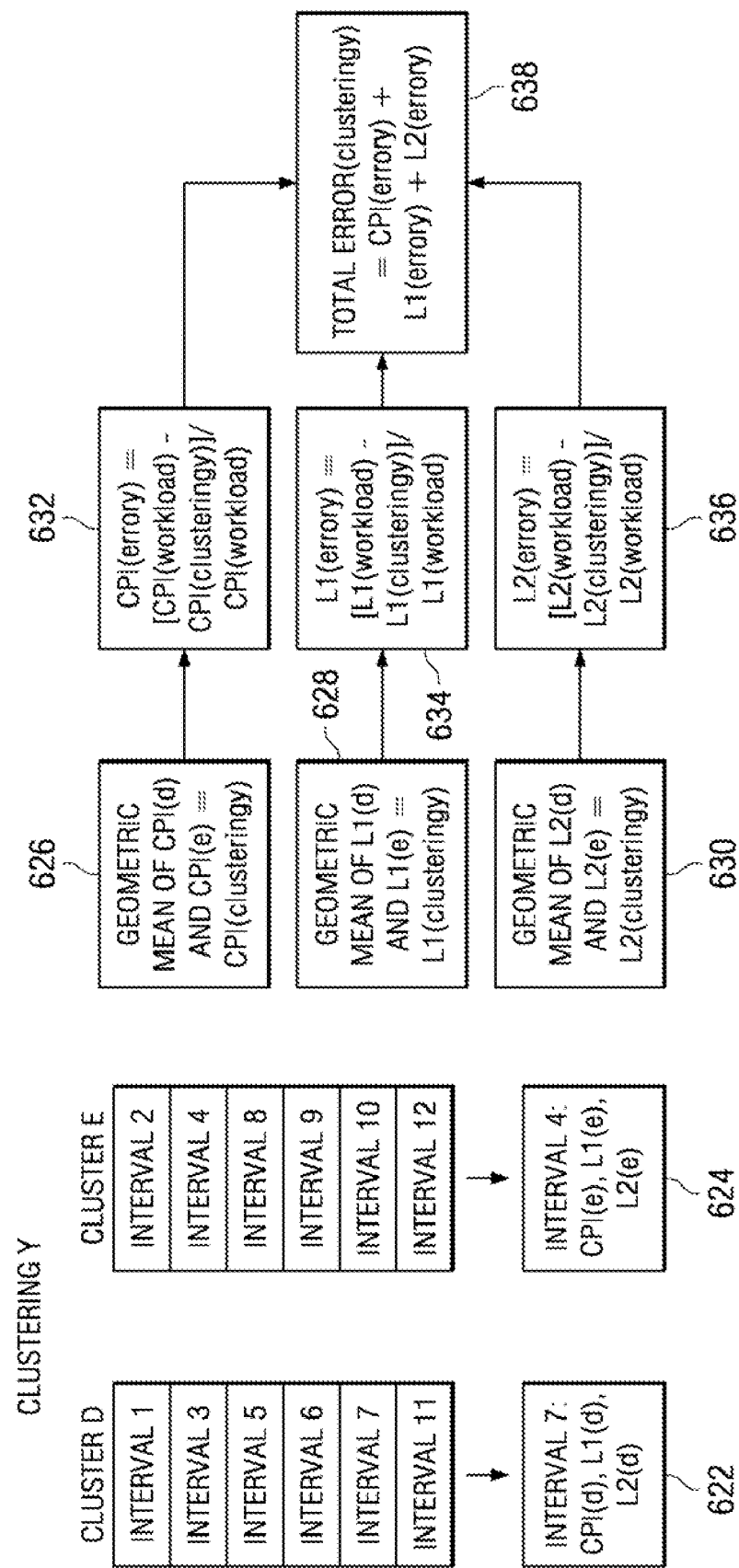

FIGS. 6A and 6B illustrate a block diagram that depicts example clusterings that were generated by the clustering routine in accordance with an illustrative embodiment. In the depicted example, dynamic instructions were divided into 12 intervals. Clustering software used a particular set of defined parameters and generated two different clusterings, clustering x and clustering y. Each clustering includes all of the dynamic instructions.

Clustering x includes three clusters: cluster A, cluster 3, and cluster C. Cluster A includes intervals 1-4. Cluster 3 includes clusters 5-8. Cluster C includes clusters 9-12.

Clustering y includes two clusters: cluster D and cluster E. Cluster D includes intervals 1, 3, 5-7, and 11, Cluster E includes intervals 2, 4, 3-10, and 12.

Referring to clustering x, interval 2 was selected as the most representative interval 602 of cluster A, interval 3 was selected as the most representative interval 604 of cluster B, and interval 9 was selected as the most representative interval 606 of cluster C.

A CPI, L1 cache miss rate, and L2 cache miss rate were determined for interval 2 as the dynamic instructions of interval 2 were being executed in real-time by the actual particular processor unit hardware. These values are referred to as CPI (a), L1(a), and L2(a), respectively.

A CPI, L1 cache miss rate, and L2 cache miss rate were determined for interval 8 as the dynamic instructions of interval 8 were being executed in real-time by the actual particular processor unit hardware. These values are referred to as CPI (b), L1(b), and L2(b), respectively.

A CPI, L1 cache miss rate, and L2 cache miss rate were determined for interval 9 as the dynamic instructions of interval 9 were being executed in real-time by the actual particular processor unit hardware. These values are referred to as CPI (c), L1(c), and L2(c), respectively.

The geometric mean of CPI(a), CPI(b), and CPI(c) is determined, and is referred to as "CPI(clusteringx)" 608. The geometric mean of L1(a), L1(b), and L1(c) is determined, and is referred to as "L1(clusteringx)" 610. The geometric mean of L2(a), L2(b), and L2(c) is determined, and is referred to as "L2(clusteringx)" 612.

A CPI error for clustering x, referred to as "CPI(errorx)" 614, is determined and is equal to: [CPI(workload)−CPI(clusteringx)] divided by CPI(workload). An L1 cache miss rate error for clustering x, referred to as "L1(errorx)" 616, is determined and is equal to: [L1(workload)−L1(clusteringx)] divided by L1(workload). Art L2 cache miss rate error for clustering x, referred to as "L2(errorx)" 618, is determined and is equal to: [L2(workload)−L2(clusteringx)] divided by L2(workload).

The total error for clustering x, referred to as "total error (clusteringx)" 620, is determined by adding together CPI (errorx) 614, L1(errorx) 616, and L2(errorx) 618.

Referring to clustering y, interval 7 was selected as the most representative interval 622 of cluster D, and interval 4 was selected as the most representative interval 624 of cluster E.

A CPI, L1 cache miss rate, and L2 cache miss rate were determined for interval 7 as the dynamic instructions of interval 7 were being executed in real-time by the actual particular processor unit hardware. These values are referred to as CPI (d), L1(d), and L2(d), respectively.

A CPI, L1 cache miss rate, and L2 cache miss rate were determined for interval 4 as the dynamic instructions of interval 4 were being executed in real-time by the actual particular processor unit hardware. These values are referred to as CPI (e), L1(e), and L2(e), respectively.

The geometric mean of CPI(d) and CPI(e) is determined, and is referred to as "CPI(clusteringy)" 626. The geometric mean of L1(d) and L1(e) is determined, and is referred to as "L1(clusteringy)" 628. The geometric mean of L2(d) and L2(e) is determined, and is referred to as "L2(clusteringy)" 630.

A CPI error for clustering y, referred to as "CPI(errory)" 632, is determined and is equal tot [CPI(workload)-CPI(clusteringy)] divided by CPI(workload). An L1 cache miss rate error for clustering y, referred to as "L1(errory)" 634, is determined and is equal to: [L1(workload)−L1(clusteringy)] divided by L1(workload). An L2 cache miss rate error for clustering y, referred to as "L2(errory)" 636, is determined and is equal to: [L2(workload)−L2(clusteringy)] divided by L2(workload).

The total error for clustering y, referred to a "total error (clusteringy)" 638, is determined by adding together CPI (errory), L1(errory), and L2(errory).

Once the total errors are calculated for each clustering, the clustering that has the lowest total error is selected. Thus, total error(clusteringx) 620 is compared to total error (clusteringy) 638 in order to select a particular clustering. If the total error for the selected clustering is not small enough, the process can be repeated by defining different parameters for the clustering software. The clustering software will then generate different clusterings that include different combinations of intervals. The total errors of these new-clusterings can then be compared to determine if the error of the clustering having the lowest total error is small enough.

Once the clustering with the smallest acceptable error is chosen, the most-representative intervals of that clustering are used as a trace. For example, if error(clusteringx) is smaller than error(clusteringy), clustering x is chosen, assuming that error(clusteringx) is small enough. If clustering x is chosen, intervals 2, 8, and 9 are chosen to be used as a trace. Thus, intervals 2, 8, and 9 represent the basic blocks that are executed by the dynamic instructions. More importantly, these intervals are selected because they best represent how the actual hardware executed the dynamic instructions using the real input data-set. Therefore, a simulator executing only these intervals would provide the most accurate picture of how the actual processor unit hardware performs when executing all of the dynamic instructions using real data-set.

Figure 7:
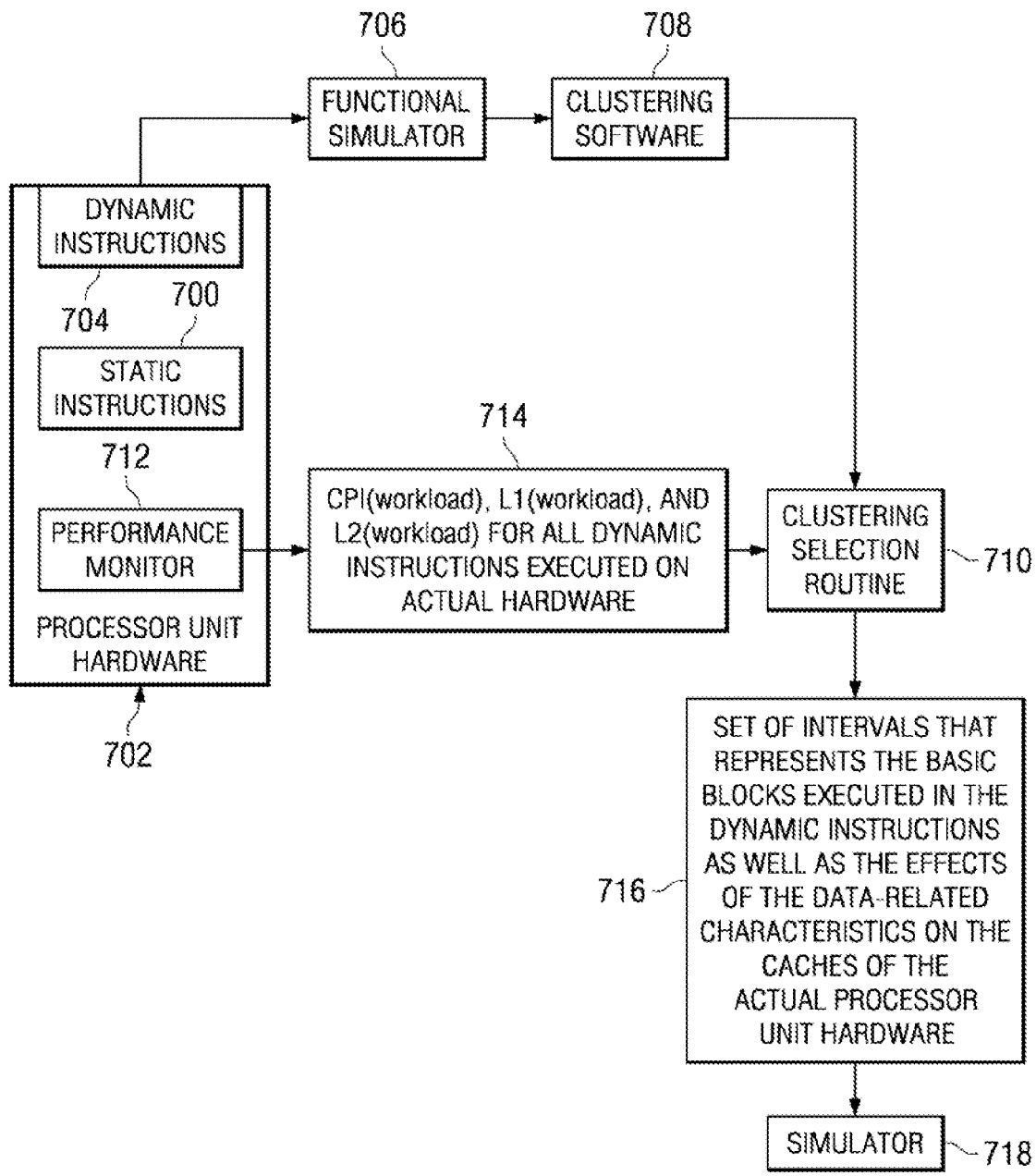
FIG. 7 depicts a block diagram of a system that generates a set of intervals that represents the basic blocks executed in the dynamic instructions as well as the effects of the data-related characteristics on the caches of a particular processor unit design and microprocessor design in accordance with an illustrative embodiment.

FIG. 7 depicts a block diagram of a system that generates a set of intervals that represents the basic blocks executed in the dynamic instructions as well as the effects of the data-related characteristics on the caches of a particular processor unit design and microprocessor design in accordance with an illustrative embodiment.

In accordance with an illustrative embodiment, static instructions 700 are executed by the actual hardware processor unit 702 resulting in dynamic instructions 704, which was the actual workload on the processor unit. The processor unit hardware 702 includes a particular microprocessor, L1 cache, and L2 cache hardware. Dynamic instructions 704 are the instructions that were actually executed by processor unit hardware 702. These dynamic instructions 704 were executed by processor unit hardware 702 in real-time.

Dynamic instructions 704 are then fed into functional simulator 706, which obtains the BBVs for each interval. Clustering software 708 groups the BBVs into representative clusters. The clustering software uses defined parameters to generate clusters. Such parameters are well-known to those skilled in the art and include the total number of clusters to generate for the clustering, the maximum number of algorithm iterations allowed to search for well-formed clusters, the tolerance of error in the algorithm results for the clustering, etc. The clustering software also identifies a most-representative interval for each cluster. The resulting array of clusters that was generated by clustering software 708 and the identification of the most representative intervals are then provided to a clustering selection routine 710.

Processor unit hardware 702 is depicted as including a performance monitor 712, although the performance monitor 712 could be located outside of processor unit hardware 702. While the dynamic instructions were executing in real-time on the processor unit hardware 702, performance monitor 712 obtained the CPI(workload), L1(workload) cache miss rate, and L2(workload) cache miss rate 714 for the entire dynamic instructions as a whole, as well as periodic samples for each interval. The CPI, L1 cache miss rate, and L2 cache miss rate for the entire dynamic instructions as a whole, and the CPI (workload), L1(workload) cache miss rate, and L2(workload) cache miss rate 714 are provided to clustering selection routine 710.

Clustering selection routine 710 uses the CPI(workload), L1(workload), L2(workload), and the CPI, L1 cache miss rate, and L2 cache miss rates for each clustering to select a clustering that has the smallest total error. A set of intervals are obtained from the selected clustering. The set of intervals 716 includes the most-representative interval of each cluster of the selected clustering. This set of intervals is then used as a trace in a simulator 718 to assess the design of processor unit 702. The most-representative intervals represent the basic blocks that are executed by the dynamic instruction and also take into account the data-related characteristics on the caches of the particular design of processor unit 702.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system.

The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least, some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method in a computer system for identifying a subset of a workload, which includes a plurality of dynamic instructions, to use as a trace, the computer-implemented method comprising:

dividing the plurality of dynamic instructions into a plurality of intervals, all of the plurality of intervals including all of the plurality of dynamic instructions and each one of a plurality of different subsets including a different subset of the plurality of intervals;

executing, on a processor unit hardware, the workload in real-time using a particular dataset, the processor unit hardware including at least one microprocessor and at least one cache;

monitoring the real-time execution of the workload to obtain information about how the processor unit hardware executes the workload when the workload is being executed using the particular dataset to form actual performance information;

determining a total number of cycles per instruction and a total cache miss rate for the workload after the processor unit hardware has finished executing the workload in real-time using the particular dataset;

determining a number of cycles per instruction and a cache miss rate for each interval included in the different subset of the plurality of intervals;

determining a weighted cycles per instruction error using the total number of cycles per instruction and the number of cycles per instruction for each interval included in the different subset of the plurality of intervals;

determining a weighted cache miss rate error using the total cache miss rate and the cache miss rate for each interval included in the different subset of the plurality of intervals;

determining a total error by adding together the weighted cycles per instruction and weighted cache miss rate for each interval included within each of the plurality of different subsets; and selecting one of the plurality of different subsets that has a smallest total error to use as the trace.

2. The computer-implemented method according to claim 1, wherein the total number of cycles per instruction and the total cache miss rate are the actual performance information.

3. The computer-implemented method according to claim 1, further comprising:

using a performance monitor that is included in the processor unit hardware to monitor the real-time execution of the workload.

4. The computer-implemented method according to claim 1, further comprising:

using a clustering routine to generate a first clustering that includes a plurality of different clusters, each one of the plurality of different clusters including at least one of the plurality of intervals;

identifying a most-representative interval for each one of the plurality of different clusters; and monitoring how the processor unit hardware executes the most-representative interval for each one of the plurality of different clusters to obtain performance information about the most-representative interval for each one of the plurality of different clusters as the processor unit hardware executes the workload in real-time using the particular dataset.

5. The computer-implemented method according to claim 4, further comprising:

determining a number of cycles per instruction and a cache miss rate for the most-representative interval for each one of the plurality of different clusters.

6. The computer-implemented method according to claim 5 further comprising:

comparing the number of cycles per instruction and the cache miss rate for the most-representative interval for each one of the plurality of different clusters to the total number of cycles per instruction and the total cache miss rate to determine a first total error for the first clustering, wherein a first one of the plurality of different subsets includes only the most-representative interval for each one of the plurality of different clusters for the first clustering; and using the first total error to evaluate how closely the first one of the plurality of different subsets represents the execution of the workload using the particular dataset.

7. The computer-implemented method according to claim 6, further comprising:

determining a centroid for each one of the plurality of different clusters for the first clustering, the centroid being an interval with a smallest Euclidean distance from all other intervals included in the plurality of different clusters.

8. The computer-implemented method according to claim 1, further comprising:

executing the trace using a simulator that simulates a behavior of processor unit hardware to assess a design of the processor unit hardware.

9. A computer program product stored on a computer readable storage device having program code embodied thereon that is executable by a computer for identifying a subset of a workload, which includes a plurality of dynamic instructions, to use as a trace, the computer program product comprising:

program code for dividing the plurality of dynamic instructions into a plurality of intervals, all of the plurality of intervals including all of the plurality of dynamic instructions and each one of a plurality of different subsets including a different subset of the plurality of intervals;

program code for executing, on a processor unit hardware, the workload in real-time using a particular dataset, the processor unit hardware including at least one microprocessor and at least one cache;

program code for monitoring the real-time execution of the workload to obtain information about how the processor unit hardware executes the workload when the workload is being executed using the particular dataset to form actual performance information;

program code for determining a total number of cycles per instruction and a total cache miss rate for the workload after the processor unit hardware has finished executing the workload in real-time using the particular dataset;

program code for determining a number of cycles per instruction and a cache miss rate for each interval included in the different subset of the plurality of intervals;

program code for determining a weighted cycles per instruction error using the total number of cycles per instruction and the number of cycles per instruction for each interval included in the different subset of the plurality of intervals;

program code for determining a weighted cache miss rate error using the total cache miss rate and the cache miss rate for each interval included in the different subset of the plurality of intervals;

program code for determining a total error by adding together the weighted cycles per instruction and weighted cache miss rate for each interval included within each of the plurality of different subsets; and program code for selecting one of the plurality of different subsets that has a smallest total error to use as the trace.

10. The computer program product according to claim 9, wherein the number of cycles per instruction and the cache miss rate are the actual performance information.

11. The computer program product according to claim 9, further comprising:

program code for using a clustering routine to generate a first clustering that includes a plurality of different clusters, each one of the plurality of different clusters including at least one of the plurality of intervals;

program code for identifying a most-representative interval for each one of the plurality of different clusters; and program code for monitoring how the processor unit hardware executes the most-representative interval for each one of the plurality of different clusters to obtain performance information about the most-representative interval for each one of the plurality of different clusters as the processor unit hardware executes the workload in real-time using the particular dataset.

12. The computer program product according to claim 11, further comprising:
   program code for determining a number of cycles per instruction and a cache miss rate for the most-representative interval for each one of the plurality of different clusters.

13. The computer program product according to claim 12 further comprising:
   program code for comparing the number of cycles per instruction and the cache miss rate for the most-representative interval for each one of the plurality of different clusters to the total number of cycles per instruction and the total cache miss rate to determine a first total error for the first clustering, wherein a first one of the plurality of different subsets includes only the most-representative interval for each one of the plurality of different clusters for the first clustering; and
   program code for using the first total error to evaluate how closely the first one of the plurality of different subsets represents the execution of the workload using the particular dataset.

14. The computer program product according to claim 13, further comprising:
   program code for determining a centroid for each one of the plurality of different clusters for the first clustering, the centroid being an interval with a smallest Euclidean distance from all other intervals included in the plurality of different clusters.

15. The computer program product according to claim 9, further comprising:
   program code for executing the trace using a simulator that simulates a behavior of processor unit hardware to assess a design of the processor unit hardware.

16. A computer system for identifying a subset of a workload, which includes a plurality of dynamic instructions, to use as a trace, the computer system comprising:
   a bus system;
   a storage device connected to the bus system, wherein the storage device stores program code; and
   a processor unit that includes at least one microprocessor and at least one cache connected to the bus system, wherein the processor unit executes the program code to:
      divide the plurality of dynamic instructions into a plurality of intervals, all of the plurality of intervals including all of the plurality of dynamic instructions and each one of a plurality of different subsets including a different subset of the plurality of intervals;
      execute the workload in real-time using a particular dataset;
      monitor the real-time execution of the workload to obtain information about how the processor unit executes the workload when the workload is being executed using the particular dataset to form actual performance information;
      determine a total number of cycles per instruction and a total cache miss rate for the workload after the processor unit has finished executing the workload in real-time using the particular dataset;
      determine a number of cycles per instruction and a cache miss rate for each interval included in the different subset of the plurality of intervals;
      determine a weighted cycles per instruction error using the total number of cycles per instruction and the number of cycles per instruction for each interval included in the different subset of the plurality of intervals;
      determine a weighted cache miss rate error using the total cache miss rate and the cache miss rate for each interval included in the different subset of the plurality of intervals;
      determine a total error by adding together the weighted cycles per instruction and weighted cache miss rate for each interval included within each of the plurality of different subsets; and
      select one of the plurality of different subsets that has a smallest total error to use as the trace.

17. The computer system according to claim 16, further comprising:
   a performance monitor that is included in the processor unit, wherein the performance monitor monitors the real-time execution of the workload.

18. The computer system according to claim 16, wherein the processor unit further executes the program code to:
   use a clustering routine to generate a first clustering that includes a plurality of different clusters, each one of the plurality of different clusters including at least one of the plurality of intervals;
   identify a most-representative interval for each one of the plurality of different clusters; and
   monitor how the processor unit executes the most-representative interval for each one of the plurality of different clusters to obtain performance information about the most-representative interval for each one of the plurality of different clusters as the processor unit executes the workload in real-time using the particular dataset.

19. The computer system according to claim 18, wherein the processor unit further executes the program code to:
   determine a number of cycles per instruction and a cache miss rate for the most-representative interval for each one of the plurality of different clusters.

20. The computer system according to claim 19, wherein the processor unit further executes the program code to:
   compare the number of cycles per instruction and the cache miss rate for the most-representative interval for each one of the plurality of different clusters to the total number of cycles per instruction and the total cache miss rate to determine a first total error for the first clustering, wherein a first one of the plurality of different subsets includes only the most-representative interval for each one of the plurality of different clusters for the first clustering; and
   use the first total error to evaluate how closely the first one of the plurality of different subsets represents the execution of the workload using the particular dataset.

* * * * *